(12) United States Patent
Rice et al.

(10) Patent No.: US 8,353,388 B2
(45) Date of Patent: Jan. 15, 2013

(54) FORKLIFT SCALE

(75) Inventors: Thomas S. Rice, Columbus, OH (US);
Ben T. Siefker, Columbus, OH (US);
Mitchell A. Tobias, Columbus, OH
(US); Darin E. Foley, Sunbury, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 924 days.

(21) Appl. No.: 12/105,889

(22) Filed: Apr. 18, 2008

(65) Prior Publication Data

US 2009/0260924 A1    Oct. 22, 2009

(51) Int. Cl.
*B66F 9/12*    (2006.01)
*B66F 9/18*    (2006.01)
*B66C 3/00*    (2006.01)
*B65G 69/00*    (2006.01)
*G01G 19/08*    (2006.01)

(52) U.S. Cl. .......... 187/237; 187/238; 414/21; 414/607; 414/785; 177/139

(58) Field of Classification Search .................. 187/222, 187/237, 238; 414/21, 629, 631, 785, 607; 177/139; *G01G 19/08, 19/12; B66F 9/06, B66F 9/075*

See application file for complete search history.

(56) References Cited

U.S. PATENT DOCUMENTS

| | | | | |
|---|---|---|---|---|
| 2,643,781 | A * | 6/1953 | Wise | 414/21 |
| 3,027,033 | A * | 3/1962 | Schuster | 414/785 |
| 3,910,363 | A | 10/1975 | Airesman | |
| 4,002,256 | A * | 1/1977 | Kroboth | 414/785 |
| 4,212,360 | A | 7/1980 | Chesher | |
| 4,323,132 | A | 4/1982 | Bradley | |
| 4,420,053 | A | 12/1983 | Russo | |
| 4,421,186 | A | 12/1983 | Bradley | |
| 4,666,004 | A | 5/1987 | Raz | |
| 4,899,840 | A | 2/1990 | Boubille | |
| 5,837,946 | A | 11/1998 | Johnson et al. | |
| 5,861,580 | A | 1/1999 | Moore et al. | |
| 5,922,998 | A | 7/1999 | Zefira | |

(Continued)

FOREIGN PATENT DOCUMENTS

DE    3744194 A1 *   7/1989

(Continued)

OTHER PUBLICATIONS

Avery Weigh-Tronix, Lift Truck Scales, Jan. 2004, 2 pages, Fairmont, Minnesota.

(Continued)

*Primary Examiner* — Michael Mansen
*Assistant Examiner* — Stefan Kruer
(74) *Attorney, Agent, or Firm* — Standley Law Group LLP

(57) ABSTRACT

A 3-point suspension forklift scale adapted for quick and easy attachment/detachment to/from a forklift—without the need for leveling or other pre-operation setup procedures. Further, due to the single lower reaction point of the forklift scale, there is no concern that the initially installed position of the forklift scale will change during use as a result of a loose adjuster, repositioning due to impact, etc. The forklift scale is designed to accurately determine the weight of a load placed on the forks or other lifting elements of the forklift, regardless of the position of the load thereon. Preferably, a forklift scale of the present invention includes a central viewing window that allows an operator see through the forklift scale when operating an associated forklift.

30 Claims, 16 Drawing Sheets

U.S. PATENT DOCUMENTS

| | | | |
|---|---|---|---|
| 5,986,560 A | 11/1999 | Rayburn | |
| 6,002,090 A | 12/1999 | Johnson et al. | |
| 6,600,111 B2 | 7/2003 | Simons | |
| 6,730,861 B1 | 5/2004 | Simons | |
| 7,026,557 B2 | 4/2006 | Rice et al. | |

FOREIGN PATENT DOCUMENTS

| | | | |
|---|---|---|---|
| EP | 500213 A1 | * | 8/1992 |
| EP | 1111353 A1 | | 6/2001 |
| FR | 2852691 A1 | * | 9/2004 |
| JP | 07260554 A | * | 10/1995 |

OTHER PUBLICATIONS

Avery Weigh-Tronix, Forklift Truck Scale, Sep. 2006, 4 pages, Fairmont, Minnesota.

Cambridge Scale Works Incorporated, Dyna-Lift Series with Model CSW-10 Indicator, http://www.cambridgescale.com/dlcsw10/dlcsw10.html, printed May 25, 2007, 2 pages.

Cambridge Scale Works Incorporated, Products, http://www.cambridgescale.com/products.html, printed May 25, 2007, 2 pages.

LTS Scale Corporation, Lift Truck Scales, http://www.ltsscale.com/products/lifttruckscales.aspx, 2005-2006, 3 pages.

Measurement Systems International, MSI3700 Magnum Plus Electronic Lift Truck Scale With Digital Weight Indicator, User Guide, 1999, p. 1-26, Seattle, Washington.

Measurement Systems International, MSI-3700 Magnum Plus Electronic Lift Truck Scales, 2004, 4 pages, Seattle, Washington.

Raco Industries, SI and Allegany Technology Weighing Products, http://www.racoindustries.com/ alleganytechnology.htm, printed May 25, 2007, 2 pages.

Sonich Industrial Sales Co., Inc., Fork Lift Scale Eliminates Central Weighing and Saves Eight Hours Per Day, http://www.sonichindustrial.com/weigh/casestudy.html, printed May 25, 2007, 2 pages.

Vishay SI Technologies, Industrial Measurement & Automation Lift Truck Specifications, http://www.sitechnologies.com/Products/Allegany/lifttruck.html, 2003, 3 pages.

Weigh-Tronix, Lift Truck Scale, Apr. 2001, 2 pages, Fairmont, Minnesota.

Weigh-Tronix, QTLTSC—QuickTach Lift Truck Scale, Certified, Aug. 2002, 4 pages, Fairmont, Minnesota.

Weigh-Tronix, QTLTSC with SimulCast™, Jun. 2004, 4 pages, Fairmont, Minnesota.

* cited by examiner

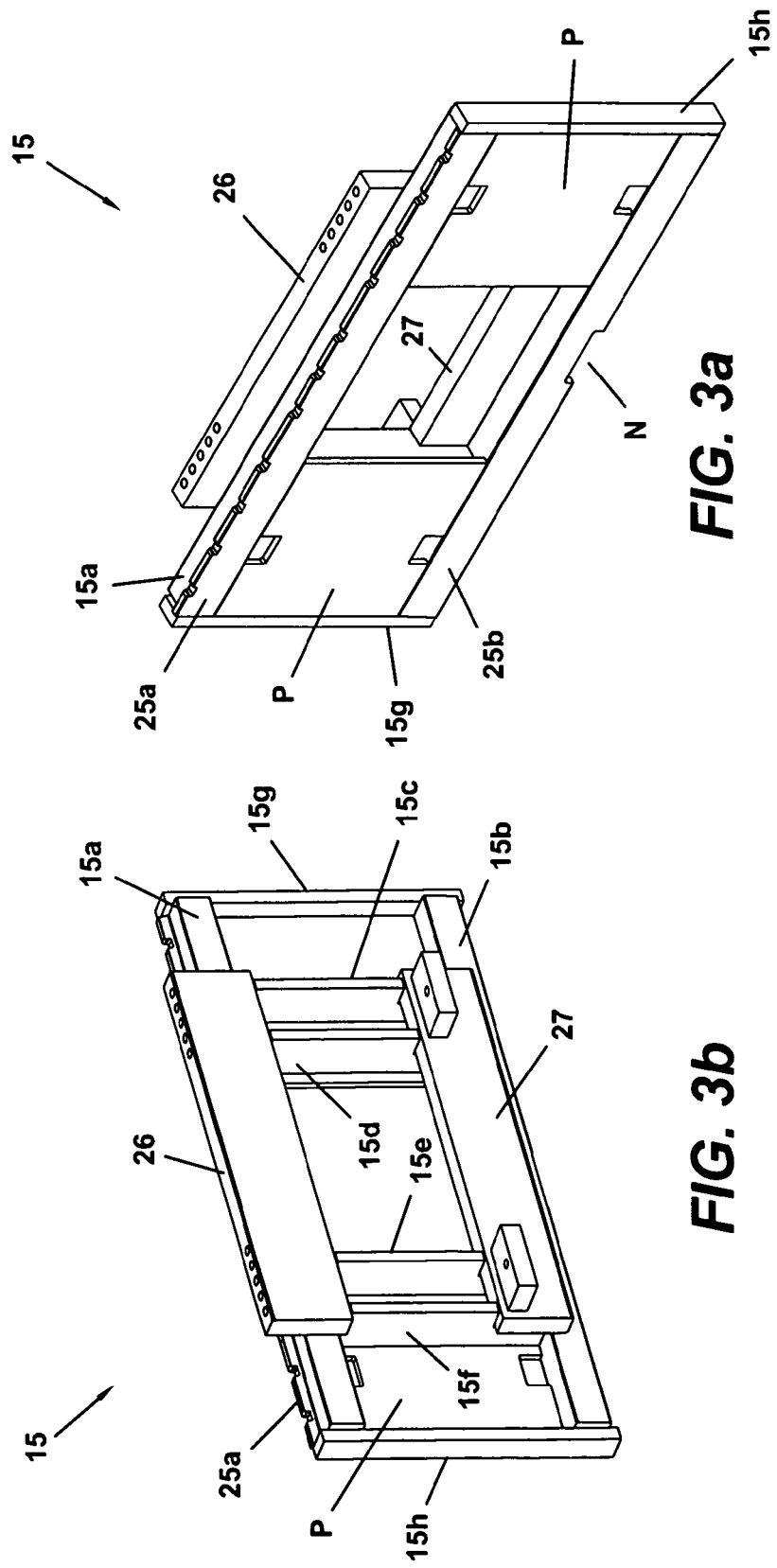

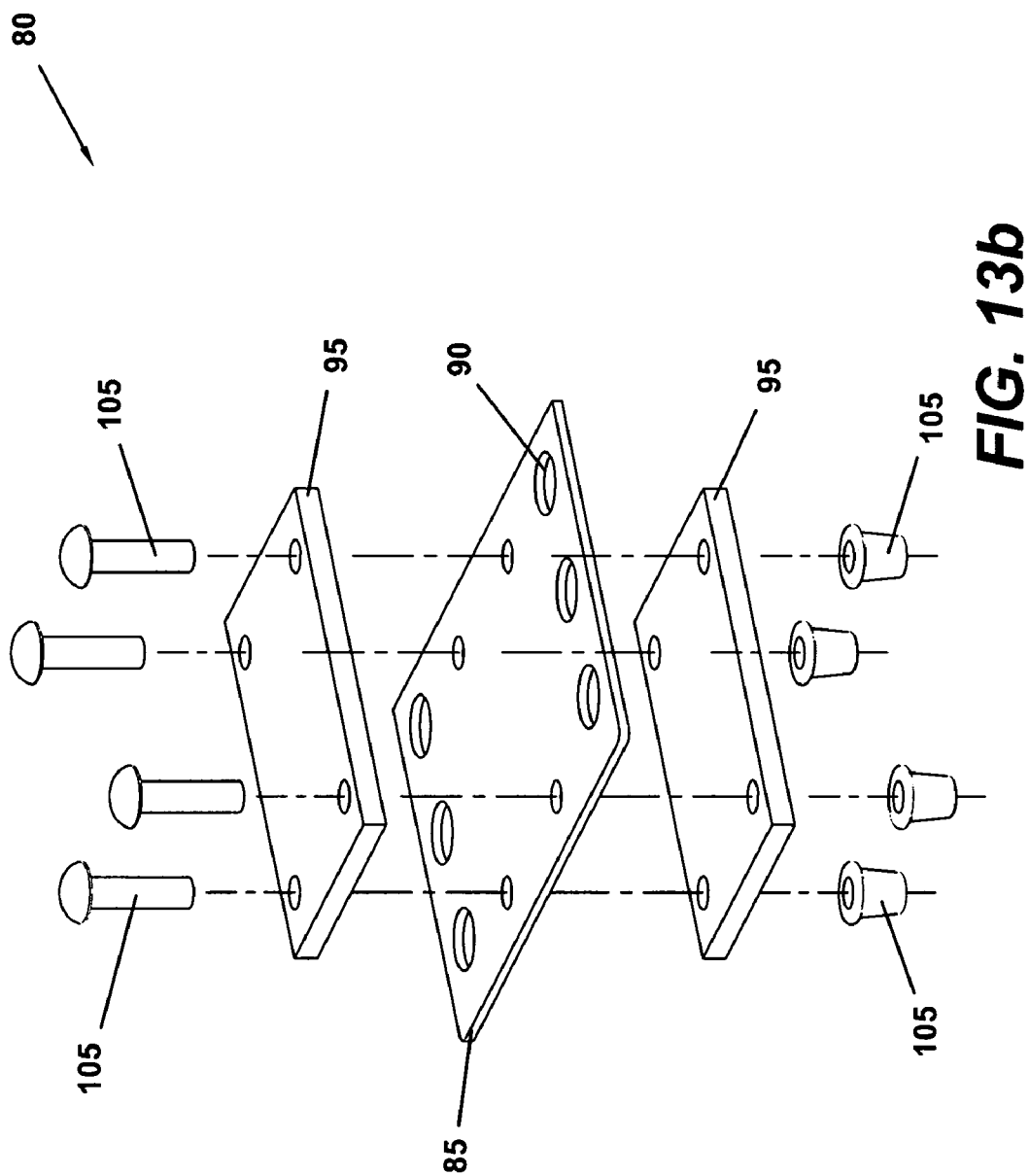

FORKLIFT SCALE

BACKGROUND OF THE INVENTIVE FIELD

The present invention is directed to a scale for use with a fork truck or forklift. More particularly, the present invention is directed to a scale that can be mounted to a forklift and used to weigh loads placed on the forks thereof.

A forklift is a well known type of industrial machinery. Typical forklifts include a main truck portion that includes the engine/motor and other drivetrain components, a cab or other seating/control area for an operator, a mast that is raised and lowered via hydraulic power, a carriage that is connected and moves with the mast, and a pair of forks that are connected to the carriage and used to pick up and move various loads.

Forklifts can be found in virtually any setting where objects, particularly heavy objects, are moved on a regular basis. For example, in a factory setting, forklifts may be used to move various equipment or supplies of materials. In a warehouse or a similar setting, forklifts may be used to load/unload trucks or other shipping containers and to move pallets of goods into various storage locations, such as on storage racks.

In certain settings, it is desirable or necessary to know the weight of the load placed on the forks of a forklift. For example, when loading or unloading goods sold by weight, it may be desirable or necessary to weigh the goods while on a pallet or while associated with another shipping device. To this end, scales such as pallet scales are often employed. In use, a forklift operator transports a load to the scale, sets the load on the scale platform, and either lowers the forks sufficiently so as to offer no support to the load or withdraws to forks from the load such as by moving the forklift in a reverse direction therefrom. Once the weight of the load has been determined, the forklift is re-engaged with the load and the load is moved to the next destination.

While such a system and procedure functions to provide the weight of loads transported by a forklift, it can be easily understood that such a system and procedure is time consuming and requires captive floor space. That is, in addition to procuring one or more suitable scales for weighing loads of interest, each scale must be placed in a location having sufficient surrounding floor space to permit adequate access by a forklift. Further, the use of such scales adds an additional step to the transportation of every such load that must be weighed in this manner. Such an inconvenience might seem insignificant in the case of a single load. However, when the multitude of loads that must be transported and weighed in this manner are considered, it can be understood that such a system and method is highly inefficient.

To this end, weighing of a load while the load is supported by the forks of a forklift is a desirable capability. To this end, various scales for attachment to a forklift have been developed. However, all of such scales of which applicant is aware suffer from one or more deficiencies that render use thereof problematic. For example, certain of such known scales produce a significant blockage of the operator's view when the mast of the associated forklift is in a raised position—a position typically occupied by the mast during load transport. Others of such scales are difficult to install to a forklift and/or to adjust once installed. Yet others produce inaccurate readings for one or various reasons, such as due to flexure of the scale or to portions of the forklift to which the scale is attached. Still others require that a complicated and/or time consuming leveling procedure be performed subsequent to scale installation and prior to use. A scale of the present invention overcomes these deficiencies.

SUMMARY OF THE GENERAL INVENTIVE CONCEPT

A forklift scale of the present invention allows a load to be weighed while supported by the forks of an associated forklift. A forklift scale of the present invention is designed for easy installation, without requiring any modification to the forklift.

A forklift scale of the present invention includes a rigid frame assembly adapted for connection to the forklift. In certain embodiments, a scale of the present invention can be installed to a forklift by simply removing the forks from the lifting carriage, and hanging the frame assembly from the lifting carriage in place of the forks. The forks may then be subsequently attached to the front of the frame assembly, such as in the same manner as they are typically attached to the lifting carriage, or otherwise.

The frame assembly includes a front frame and a rear frame. The rear frame mounts to the lifting carriage of the forklift. The front frame is associated with the rear frame and includes structure for attaching and suspending the forks of the forklift therefrom. The front frame is vertically displaceable with respect to the rear frame within some restricted distance.

A forklift scale of the present invention makes use of a 3-point suspension design. More specifically, once mounted to a forklift, the rear frame of the forklift scale will contact and react with the lifting carriage of the forklift in only three locations: at the location of two upper mounting elements associated with a rear frame upper frame member and at the location of a standoff that extends rearward some distance from substantially the centerline of a rear frame lower frame member.

The frame assembly forms a substantially hollow rectangle, thereby providing a viewing window through which an operator can see when operating an associated forklift. Load cells are located laterally outward of the left and right sides of the viewing window. The load cells are mounted between the front and rear frames, so as to react to loads placed on the forks associated with a scale of the present invention.

When a load is applied to the forks, shear forces are produced. The resulting shear-related downward displacement of the front frame with respect to the rear frame is detected by the load cells. The outputs of the load cells are used to determine the load on the forks.

Applying a load to the forks also produces a longitudinal bending moment. The bending moment results in tension forces near the top of the frame assembly and compression forces near the bottom of the frame assembly. Specialized flexures connected between the front frame and the rear frame are used to transfer these forces to the rear frame. The flexures are designed to be strong enough to resist tensile and compressive buckling, but torsionally weak enough in the vertical direction so as not to interfere with downward displacement of the front frame when a load is placed on the forks connected to the scale. The resistance of the flexures to vertical displacement of the front frame may be adjusted, as is described in more detail below.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3a is a front perspective view of a front frame portion of the forklift scale of FIG. 1;

FIG. 3b is a rear perspective view of a front frame portion of the forklift scale of FIG. 1;

FIG. 13b is an exploded view of one portion of the split flexure assembly of FIG. 13a.

DETAILED DESCRIPTION OF EXEMPLARY EMBODIMENT(S)

Figure 1A:
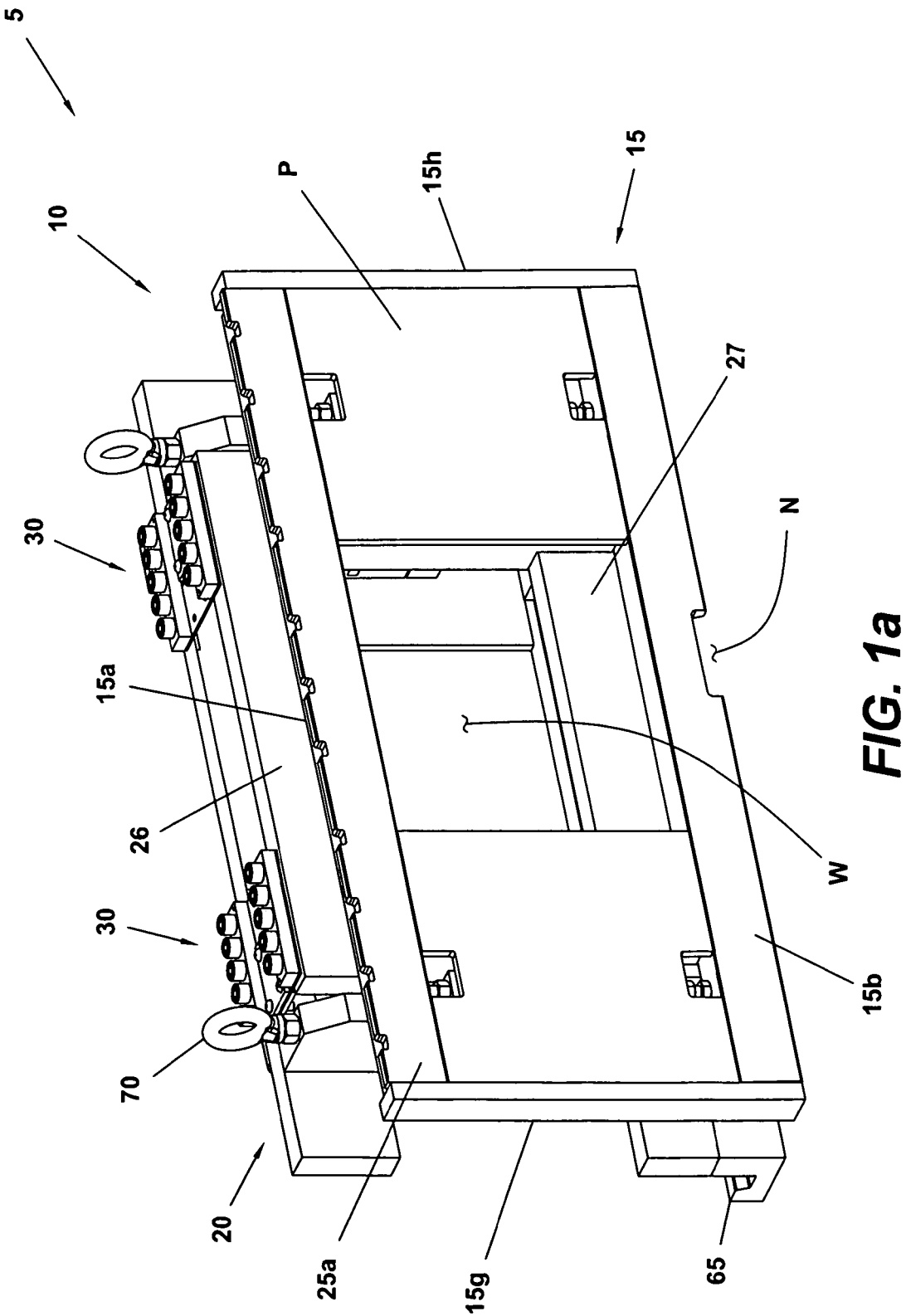
FIG. 1a is a front perspective view of one exemplary embodiment of an assembled forklift scale of the present invention.
Figure 1B:
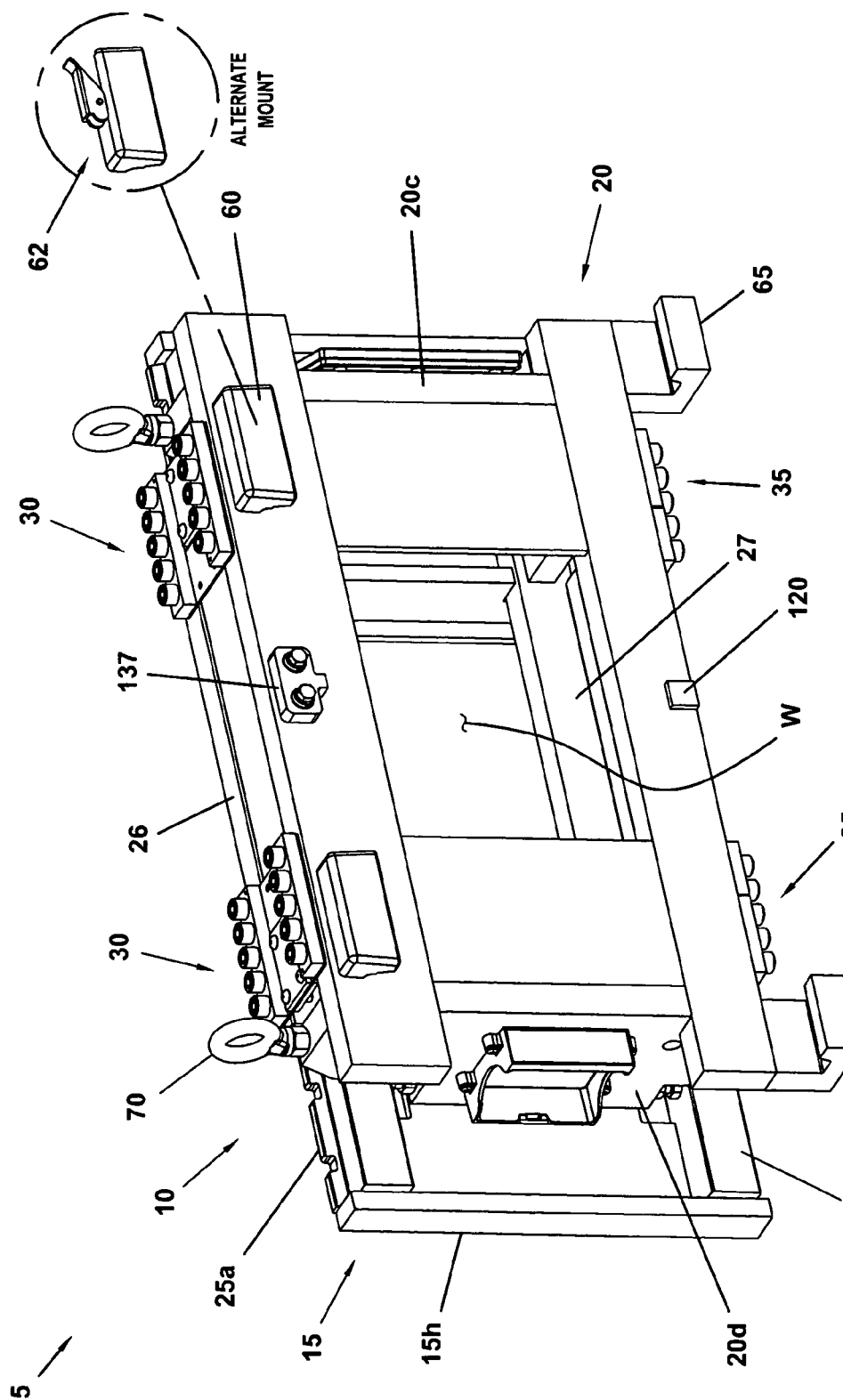
FIG. 1b is a rear perspective view of the forklift scale of FIG. 1.

One exemplary embodiment of a forklift scale 5 of the present invention can be observed in FIGS. 1-10. This forklift scale 5 includes a frame assembly 10 comprising a front frame 15 and a rear frame 20. The rear frame 20 mounts to the lifting carriage (which may also be commonly referred to in the art as a lift bracket, fork carrier, etc.) of a forklift. The front frame is 15 associated with the rear frame 20, but is vertically displaceable with respect to the rear frame within some restricted distance.

The rear frame 20 includes a pair of substantially parallel and spaced apart upper and lower horizontal frame members 20a, 20b, that are connected by a pair of substantially parallel and spaced apart vertical frame members 20c, 20d. Connection of the frame members 20a, 20b, 20c, 20d is preferably via welding or some other technique that results in an acceptably strong and rigid rear frame 20.

The front frame 15 also includes a pair of substantially parallel and spaced apart upper and lower horizontal frame members 15a, 15b, that are connected by pairs of substantially parallel and spaced apart vertical frame members 15c-15d, 15e-15f. A pair of vertical end members 15g, 15h are also connected between the horizontal frame members 15a, 15b. Connection of the vertical frame and end members 15a-15h to the horizontal frame members 15a, 15b is preferably accomplished via welding or some other technique that results in an acceptably strong and rigid front frame 15.

The front frame may also include a pair of cover plates P. When present, the cover plates P may further stiffen the front frame 15, protect the load cells 40 and/or impart a more finished appearance to the forklift scale 5. In this particular embodiment, the cover plates P are disposed laterally of a central viewing window W (as described in more detail below). As shown herein, the cover plates abut and may be attached to various front frame elements.

In this embodiment, an upper flexure rail 26 extends upward from the front frame 15. As shown, the upper flexure rail 26 is welded to an upper notch in the vertical frame members 15c-15d, 15e-15f and to the rear of the upper fork receiver 25a. As also shown, a lower flexure rail 27 is welded to a lower notch in the vertical frame members 15c-15d, 15e-15f and to the rear of the lower fork receiver 25b. Obviously, other arrangements and points and methods of attachment are also possible.

The horizontal frame members 15a, 15b are associated with an upper and lower fork receiver 25a, 25b that cooperate to receive and retain a pair of forks in a manner that would be understood by those of skill in the art. For example, in the particular embodiment shown, the lower fork receiver 25b includes a notch N that facilitates fork installation. The upper fork receiver 25a may be of the typical notched design shown. The fork receivers 25a, 25b may be integral to the horizontal frame members 15a, 15b or may be separate members that are welded or otherwise affixed thereto.

The front frame 15 and rear frame 20 are connected by upper and lower flexure assemblies 30, 35 (or flexures), the design and function of which is described in more detail below. The upper flexure assemblies 30 are affixed to and connect a top face of the upper horizontal frame member 20a of the rear frame 20 with the upper flexure rail 26 of the front frame 15. The lower flexure assemblies 35 are affixed to and connect a bottom face of the lower horizontal frame member 20b of the rear frame with the lower flexure rail 27 of the front frame. The flexure assemblies 30, 35 maintain a substantially parallel relationship between the front frame 15 and rear frame 20.

A pair of vertically-oriented load cells 40 are interposed between the front frame 15 and the rear frame 20, such that the front frame is supported thereby. Various load cells may be suitable for use with a forklift scale of the present invention, and such would be understood by one of skill in the art. As shown however, this particular forklift scale 5 employs a S-type load cell that is suitable for measuring both tension and compression forces. Preferably, the load cells 40 are located laterally outward of and substantially equidistantly from the vertical centerline of the frame assembly 10. The load cells are also preferably located at a sufficient distance from the vertical centerline of the frame assembly 10 so as not to obstruct the central viewing window W. The central viewing window W provides the forklift operator with improved visibility when the lifting carriage of the forklift is in a raised position, and also while the lifting carriage is in a lowered position, such as when engaging a load.

Figure 2:
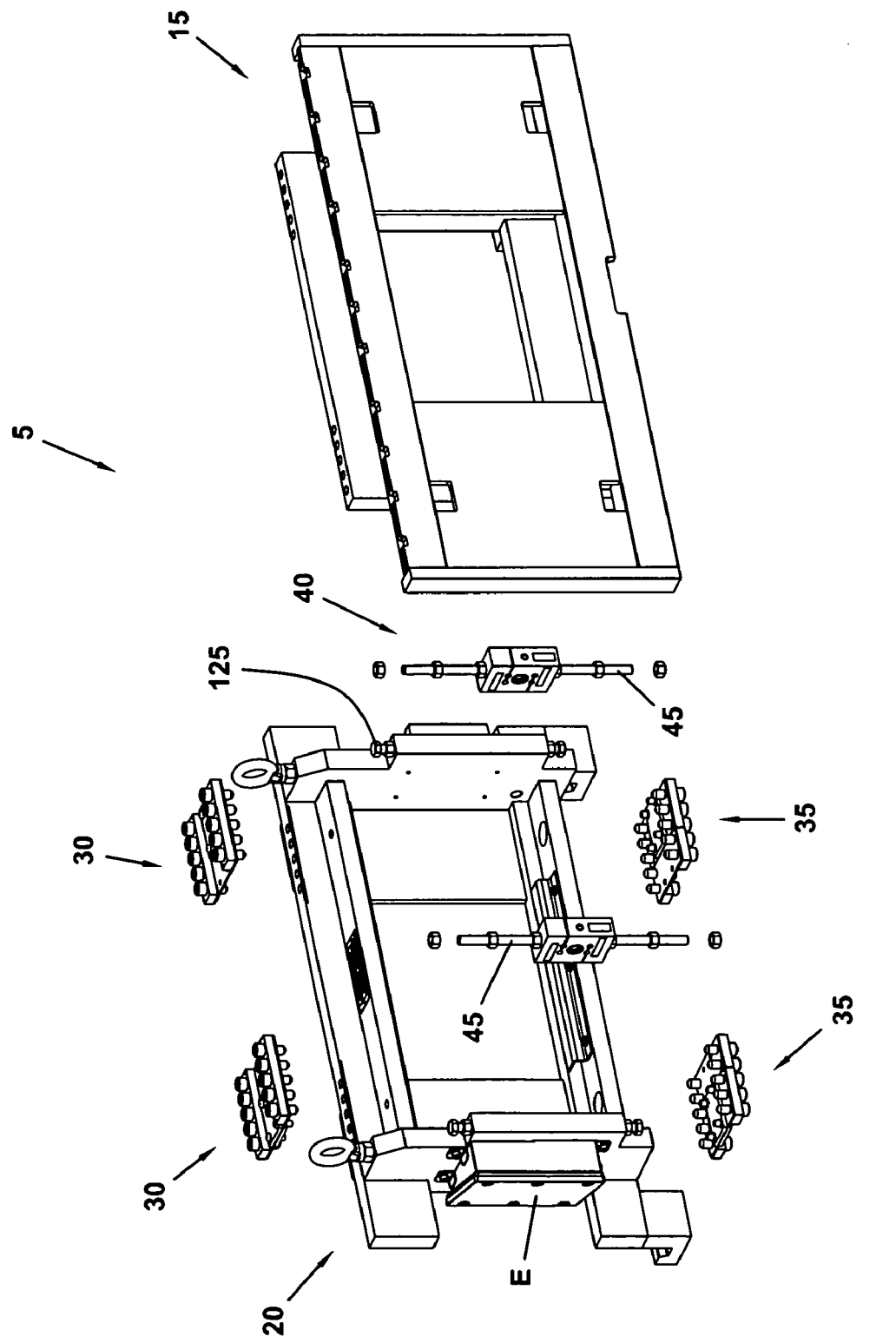
FIG. 2 is an exploded front perspective view of the forklift scale of FIG. 1.
Figure 4A:
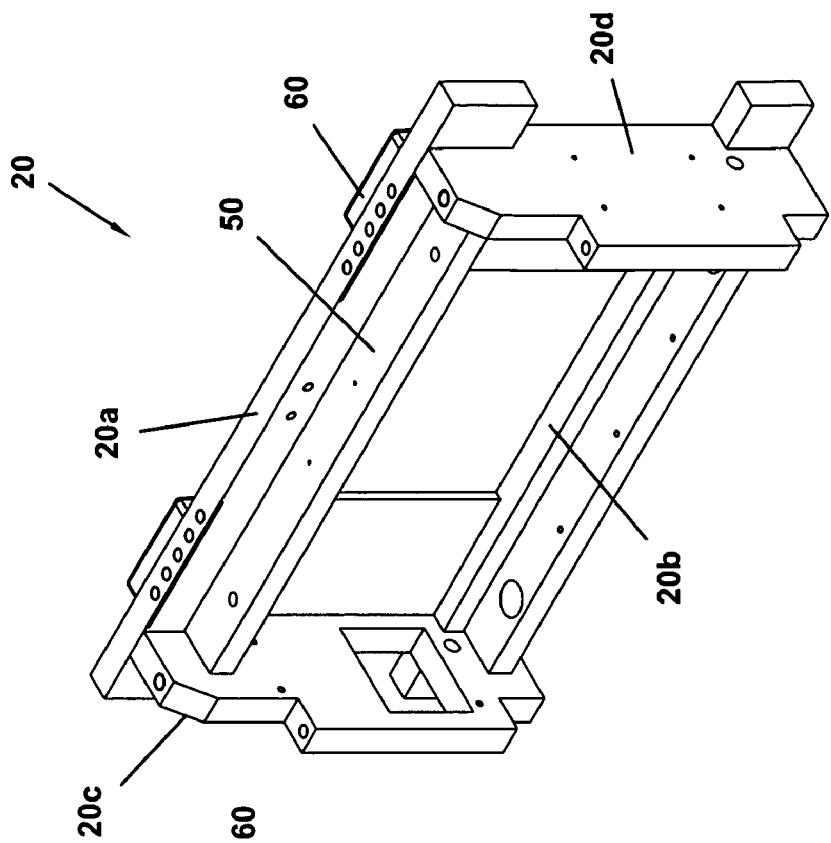
FIG. 4a is a front perspective view of a rear frame portion of the forklift scale of FIG. 1.
Figure 4B:
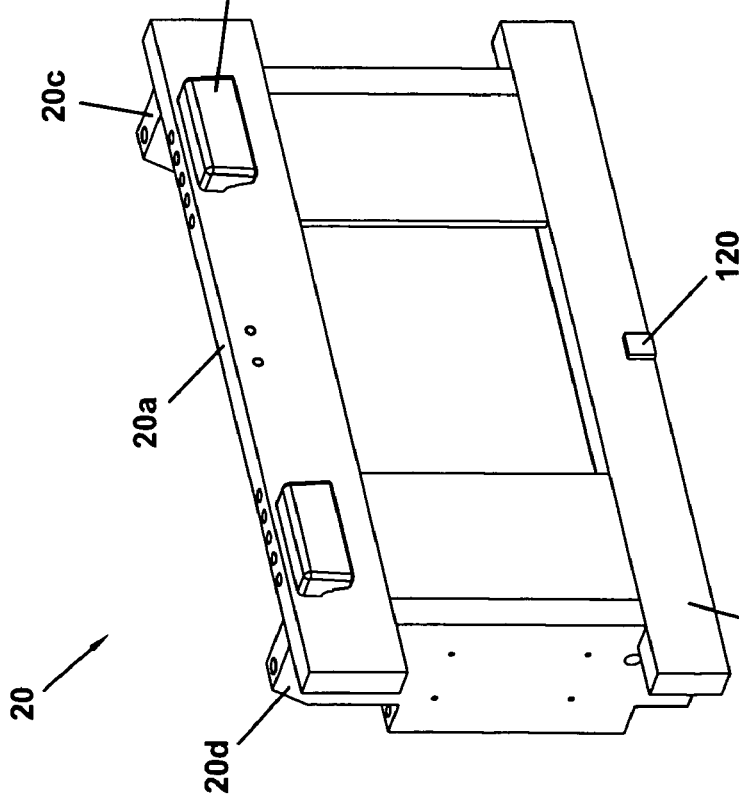
FIG. 4b is a rear perspective view of a rear frame portion of the forklift scale of FIG. 1.
Figure 5:
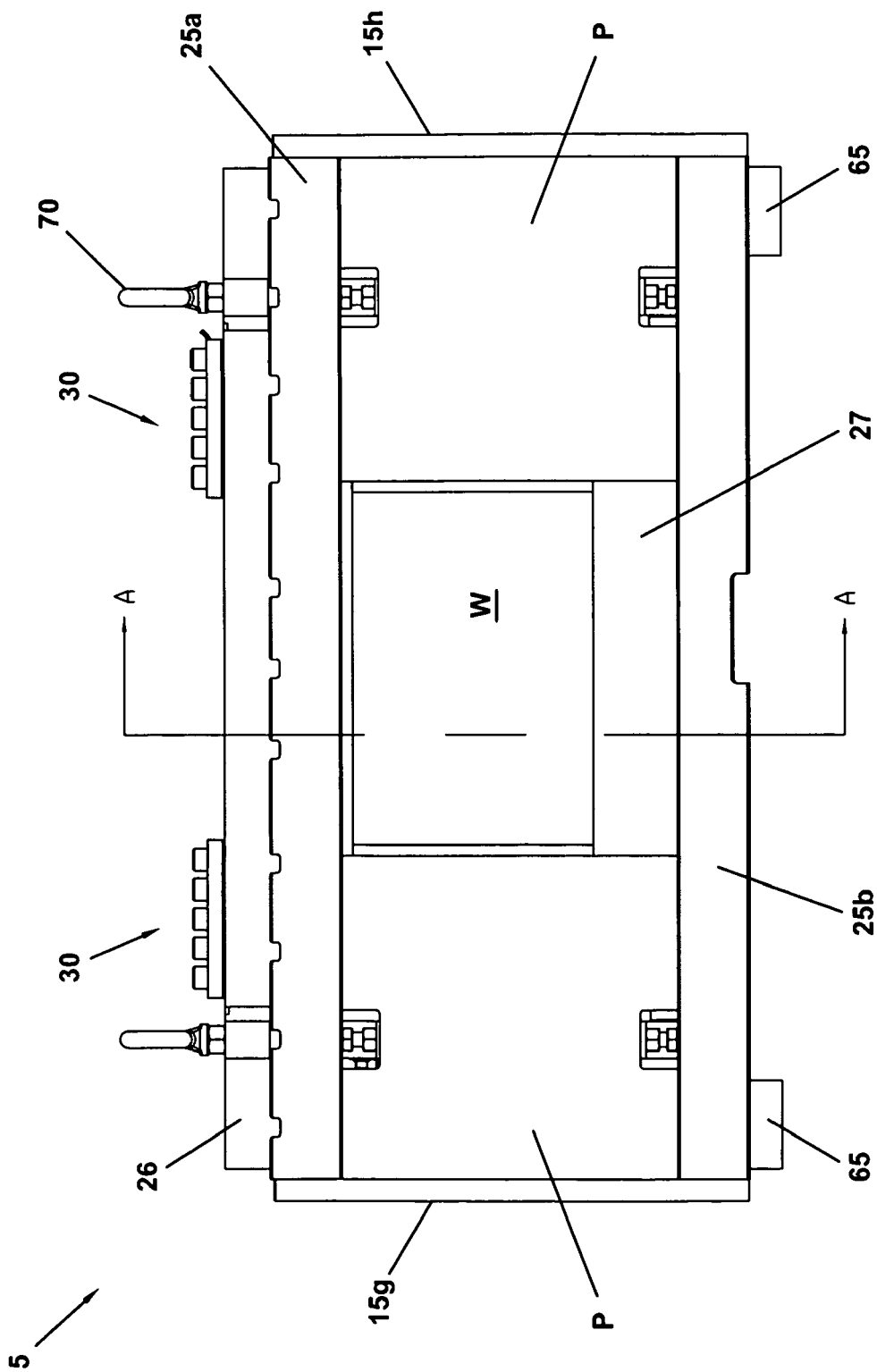
FIG. 5 is a front elevation view of the forklift scale of FIG. 1.
Figure 6:
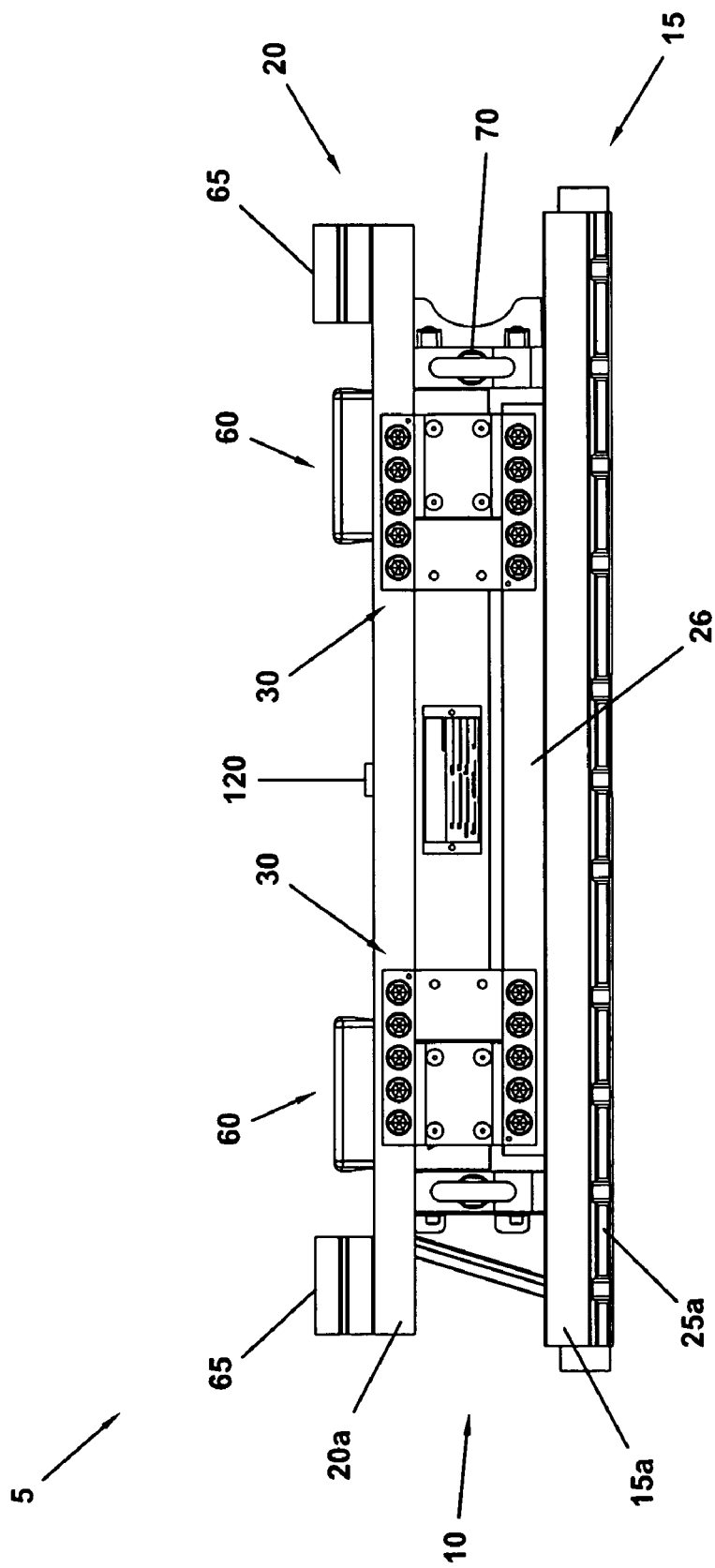
FIG. 6 is a top plan view of the forklift scale of FIG. 1.
Figure 7:
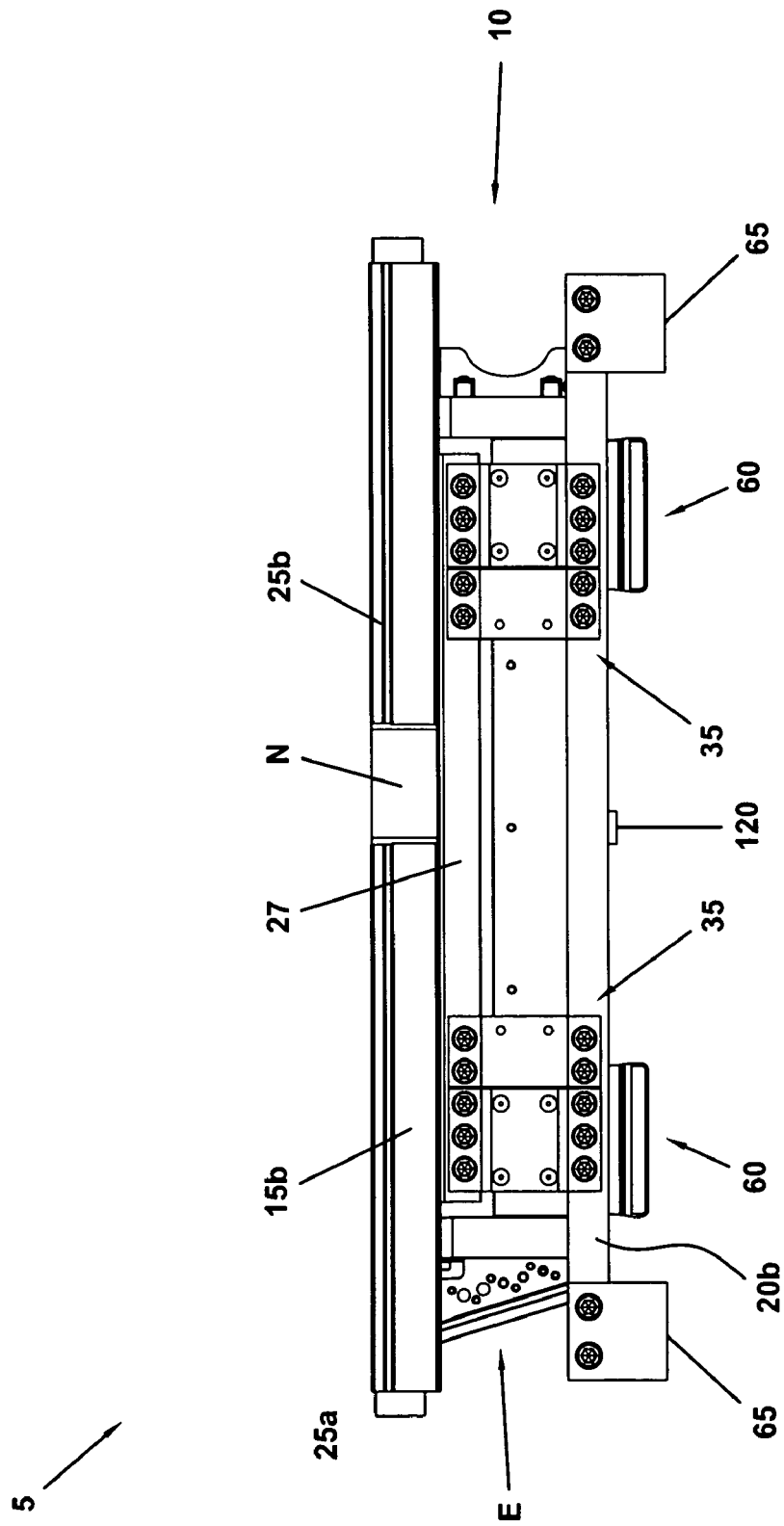
FIG. 7 is a bottom plan view of the forklift scale of FIG. 1.
Figure 8:
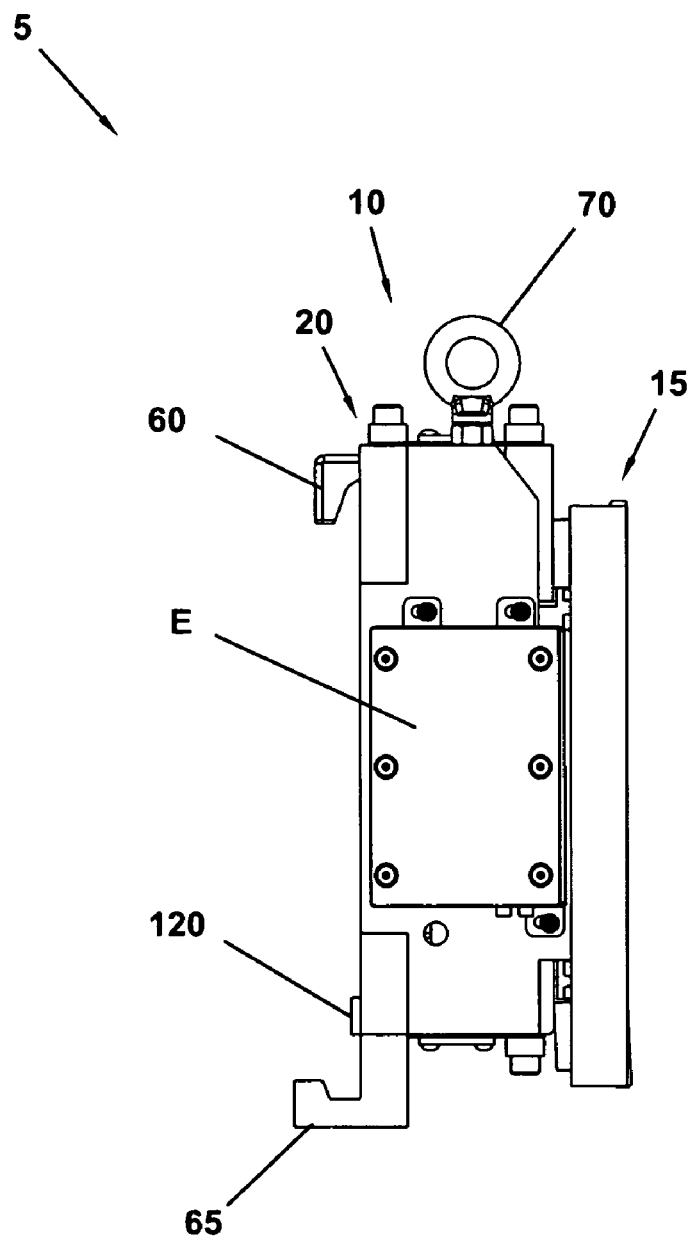
FIG. 8 is a left-side elevation view of the forklift scale of FIG. 1.
Figure 9:
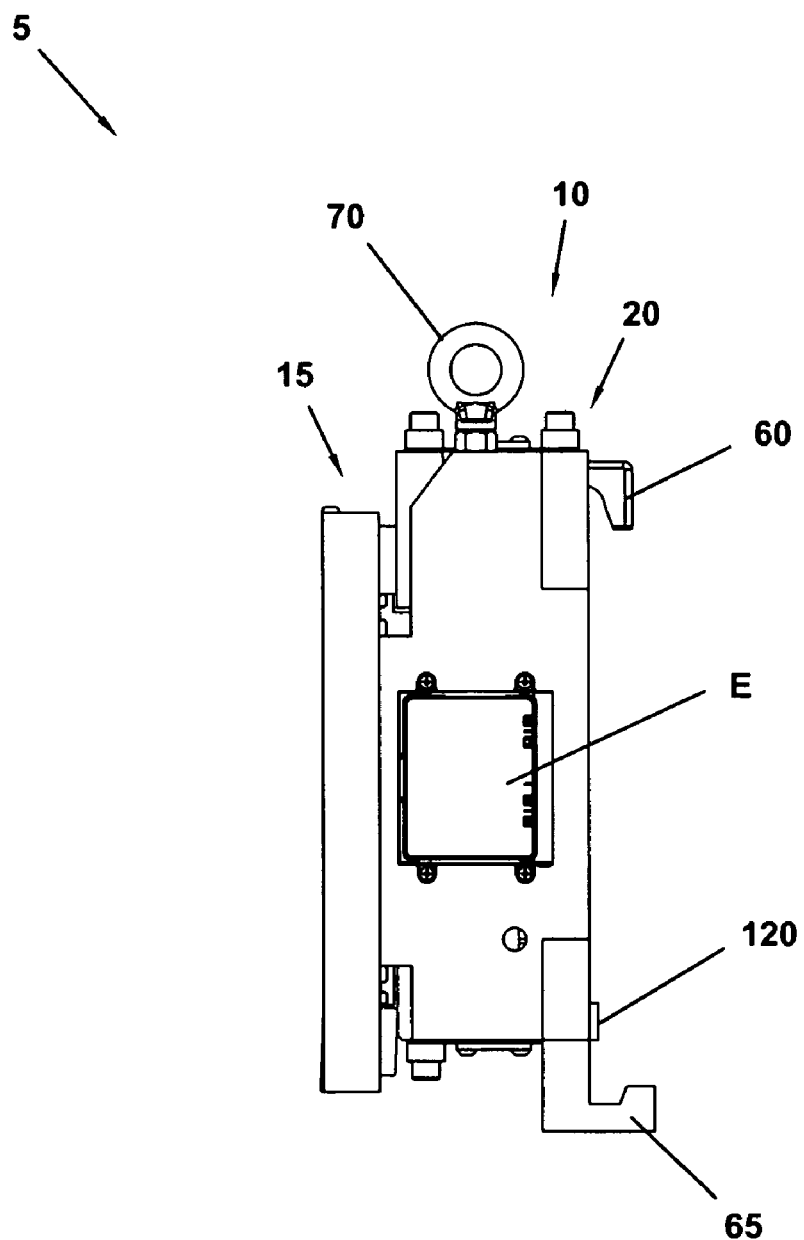
FIG. 9 is a right-side elevation view of the forklift scale of FIG. 1.
Figure 10:
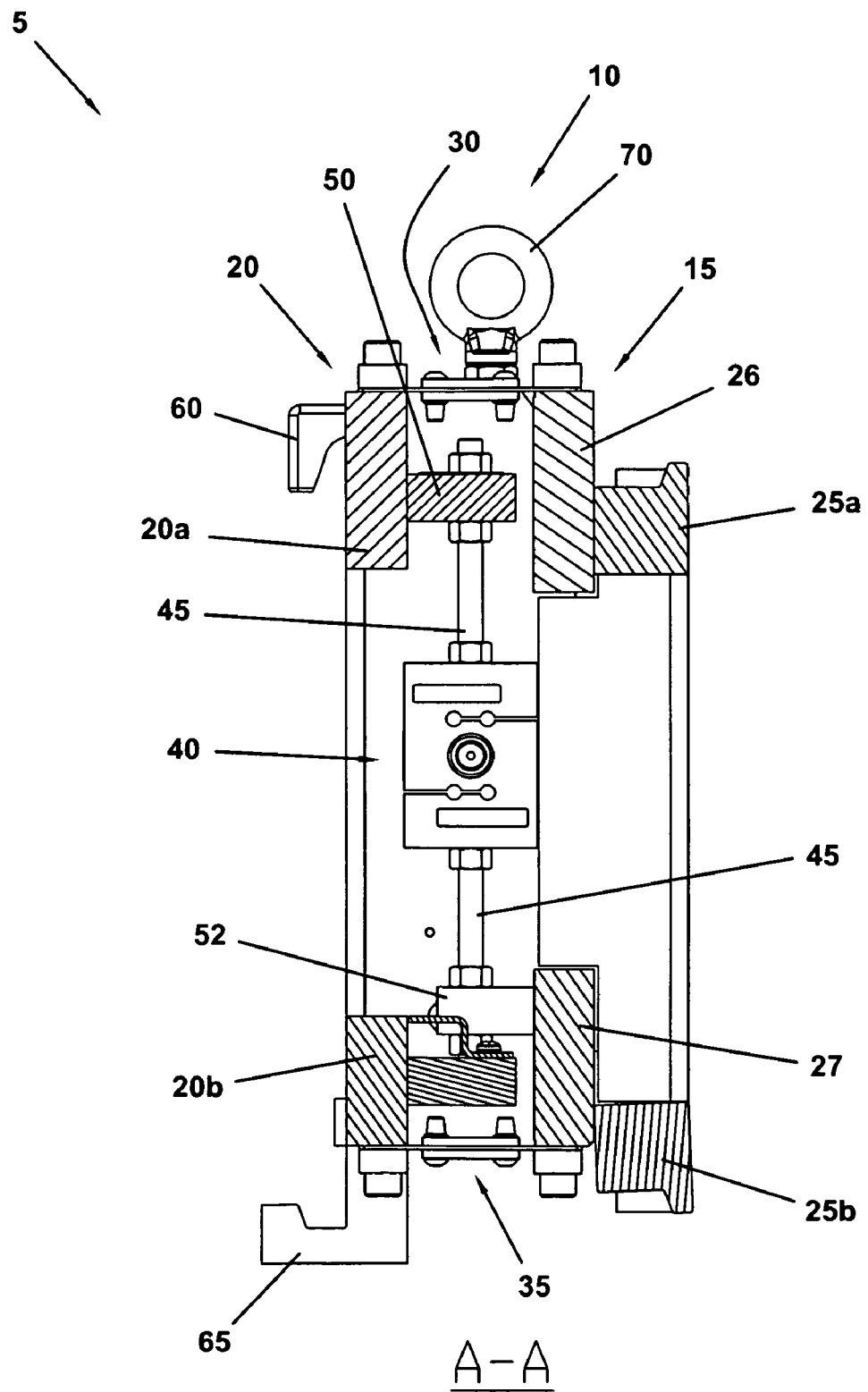
FIG. 10 is a cross-section of the forklift scale of FIG. 1, taken along line A-A shown in FIG. 5.

As can be best observed in FIGS. 2 and 10, opposite ends of each load cell 40 are connected by mounting studs 45 between the front frame 15 and rear frame 20. In this particular embodiment, an upper mounting stud 45 connects one end of its respective load cell 40 to a load cell mounting member 50 associated with the rear frame 20. Similarly, a lower mounting stud 45 connects the opposite end of its respective load cell 40 to a load cell mounting member 52 associated the lower flexure rail 27 of the front frame 15. By this arrangement, vertical movement of the front frame 15 with respect to the rear frame 20 is detected by the load cells 40.

The forklift scale 5 preferably, but not essentially, includes a hard stop(s) 125 or some other element(s) to restrict vertical displacement of the front frame 15 to some predetermined and acceptable amount. For example, if a forklift employing a scale of the present invention is used to lift a load that is beyond the rating of the scale, the hard stop(s) 125 may prevent damage to the scale that might otherwise occur as a result of excessive displacement of the front frame 15. Such hard stop(s) 125 may be adjustable, as shown, or may be of a fixed nature. Such hard stop(s) 125 may also include a resilient bumper portion.

Various electronics associated with the load cells 40 are preferably placed within an enclosure E that may be mounted at one or more locations on the front or rear frame 15, 20. The enclosure E, or a similar enclosure, may also house electronics that facilitate wireless transmission of signals from the load cells 40 to one or more receivers. Such receivers may be mounted to the forklift and may also be located remotely therefrom. An inclinometer (not shown) may also be provided to measure the inclination of the lifting carriage so as to compensate forklift scale weight readings accordingly. When present, an inclinometer may reside within the enclosure E, but could also reside external thereto (such as on the front or rear frame).

Mounting of a forklift scale of the present invention to a forklift may be accomplished in various ways. This particular embodiment of the forklift scale 5, however, makes use of a pair of mounting hooks 60, which would be quite familiar to one of skill in the art. As would be understood by one skilled in the art, and as can be observed in FIG. 11, these mounting hooks 60 will overlie and engage an upper fork carrier 130 of a typical lifting carriage L when the forklift scale 5 is affixed to a forklift F. Particularly, the mounting hook elements act to suspend the forklift scale 5 from the upper fork carrier 130 of a lifting carriage L.

Figure 11:
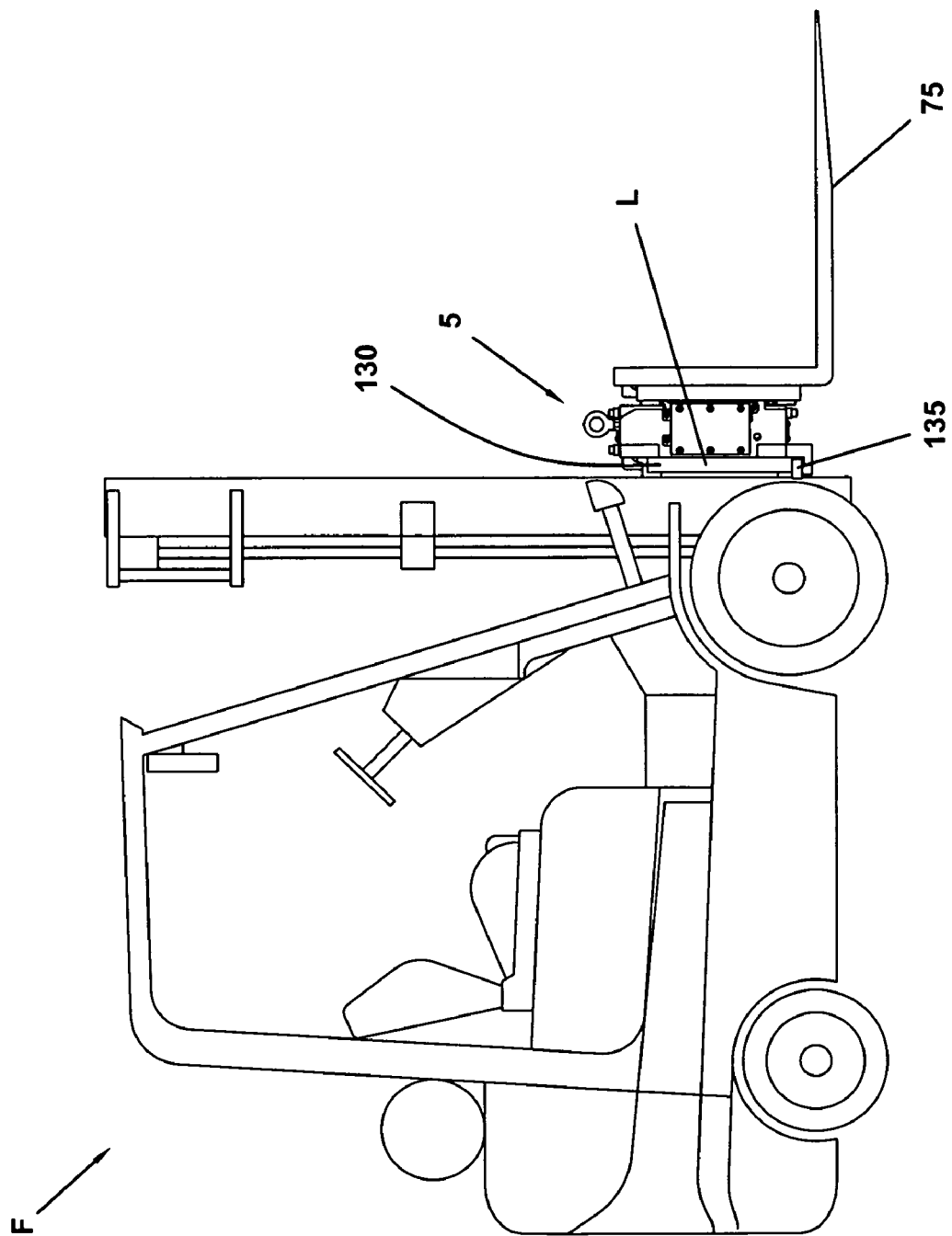
FIG. 11 shows the forklift scale of FIG. 1 mounted to a forklift, with lifting forks attached to the forklift scale.

The forklift scale 5 may also include a pair of safety restraints 65 that are used to prevent the forklift scale from being lifted from the lifting carriage of the forklift, and to prevent or limit any separation between at least a lower portion of the forklift scale and a lower fork carrier 135 of the lifting carriage. In this embodiment, the safety restraints 65 may be affixed to the lower horizontal frame member 20b of the rear frame 20 after the forklift scale 5 is suspended on the lifting carriage L by the mounting hooks 60. As can be seen in FIG. 11, the safety restraints 65 do not typically engage the lower fork mounting member 135 of the lifting carriage L when the forklift scale 5 is suspended from the lifting carriage.

Lateral movement of a forklift scale of the present invention with respect to the lifting carriage of a forklift can be restrained in a number of ways, as would be understood by one of skill in the art. In the particular embodiment shown, lateral restraint is accomplished by a restraining element 137 that is affixed to or is formed on a back surface of the upper horizontal frame member 20a of the rear frame 20. The restraining element 137 engages a notch present in the upper fork carrier 130 of the lifting carriage L.

In an alternate embodiment of the present invention, a forklift scale may employ a fork mounting structure such as that typically present on a forklift. More particularly, the forklift scale 5 may include a pair of upper latch mechanisms 62 (see alternate latch mechanism shown in FIG. 1b), such as would be familiar to one skilled in the art. These latch mechanisms 62 include spring-loaded pins or other elements that engage with locating notches on the upper fork mounting member of a typical forklift lifting carriage. These notches may be the same as or similar to, for example, the notches present on the upper fork receiver 25a of the front frame 15. As with the embodiment described above, such an embodiment of a forklift scale may also include a pair of safety restraints that are used to prevent inadvertent dislocation of the forklift scale from the lifting carriage of a forklift. The latch mechanisms may further inhibit lateral movement of such a forklift scale on the lifting carriage of a forklift.

One or more lifting elements may be present on the frame assembly 10 to assist with mounting the forklift scale 5 to a forklift. In this embodiment, an eye bolt 70 is attached to the top of each vertical frame member 20c, 20d of the rear frame 20 for this purpose. Various other lifting elements may be employed in lieu of an eyebolt in other embodiments of the present invention.

Once the forklift scale 5 has been secured to the lifting carriage L of a forklift F, as described above and shown in FIG. 11, lifting forks 75 may be attached to the front frame 15. As previously described, the front frame 15 of this embodiment of the forklift scale 5 includes an upper and lower fork carrier 25a, 25b of substantially the same type found on most forklift carriages. As such, the forks 75 are installed to the forklift scale 5 using the notch N in the lower fork carrier 25b to allow the upper mounting portion of the fork to clear the upper fork carrier 25a. The forks 75 may subsequently be slid outward and latched to the upper fork carrier 25a using a latching mechanism typically present on each fork (such as the latching mechanism 62 described above).

As mentioned previously, a forklift scale of the present invention makes use of a 3-point suspension design. As can be understood most clearly by reference to FIGS. 1b and 11, once mounted to a forklift F, the rear frame 20 of the forklift scale 5 will contact and react with the lifting carriage L of the forklift in only three locations: at the location of the two upper mounting elements 60 associated with the upper frame member 20a, and at the location of a standoff 120 that extends rearward some distance from substantially the centerline of the lower frame member 20b.

With the forklift scale 5 mounted to the lifting carriage L of the forklift F, and the lifting forks 75 mounted to front frame 15 of the forklift scale, the forklift can be used to pick up and transport loads in typical fashion. As can be understood from the foregoing description and accompanying drawing figures, when a load is placed on the lifting forks 75, the flexure assemblies 30, 35 of the forklift scale 5 permit a reactionary downward displacement of the front frame 15 with respect to the rear frame 20. The forces associated with this displacement are transferred to the load cells 40 and, as would be clearly understood by one skilled in the art, produce an output signal that is indicative of the weight of the load on the lifting forks 75. During downward displacement of the front frame 15, the flexure assemblies 30, 35 also generally maintain the substantially parallel relationship between the front frame and the rear frame 20.

It can be further appreciated that, especially due to the length of typical lifting forks, differing load locations thereon may produce forces of various magnitudes that materialize as tension forces near the top of the frame assembly 10 and compression forces near the bottom of the frame assembly, as transmitted from the front frame 15 to the rear frame 20 through the upper and lower flexure assemblies 30, 35. These forces will be less severe when the load is located on the lifting forks at a position nearer the forklift scale, and more severe when the load is located further from the forklift scale.

Significant tensile and compressive forces may be produced when lifting heavy loads. In order to prevent these forces from distorting the frame assembly 10 (such as by altering the parallel relationship between the front frame 15 and rear frame 20), the assembled frame assembly must be sufficiently stiff. Without such stiffness, distortion of the frame assembly could result in erroneous weight indications, such as by affecting the readings of the load cells 40.

While the frame assembly of a forklift scale of the present invention must be stiff, it must simultaneously allow for some amount of vertical displacement of the front frame 15 when loaded. Use of flexure assemblies, such as the exemplary flexure assemblies 30, 35, allows for the construction of a sufficiently stiff frame assembly 10 that still permits the desired vertical displacement between the frames 15, 20. The flexure assemblies 30, 35 help to maintain the substantially parallel relationship between the frames, and also act to transmit forces from the front frame to the rear frame (which is securely affixed to the lifting carriage of the forklift). As shown herein, the flexure assemblies 30, 35 are preferably, but not necessarily, located on the forklift scale 5 in a manner and/or in a position that allows for easy access to the load cells 40.

Figure 12A:
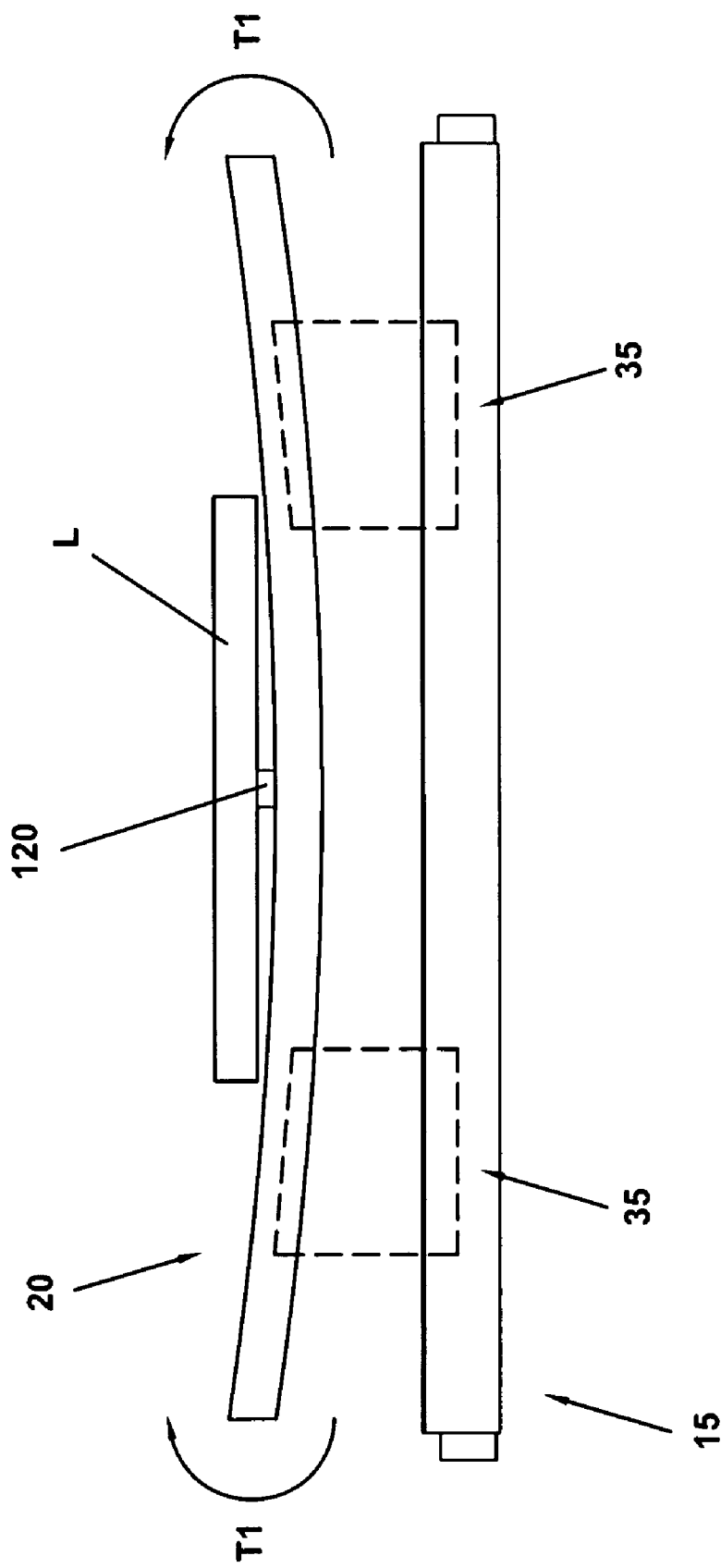
FIG. 12a is a diagrammatic top plan view representing the urged bending of at least a lower portion of a rear frame of a loaded forklift scale of the present invention when provided with a solid lower flexure assembly.
Figure 12B:
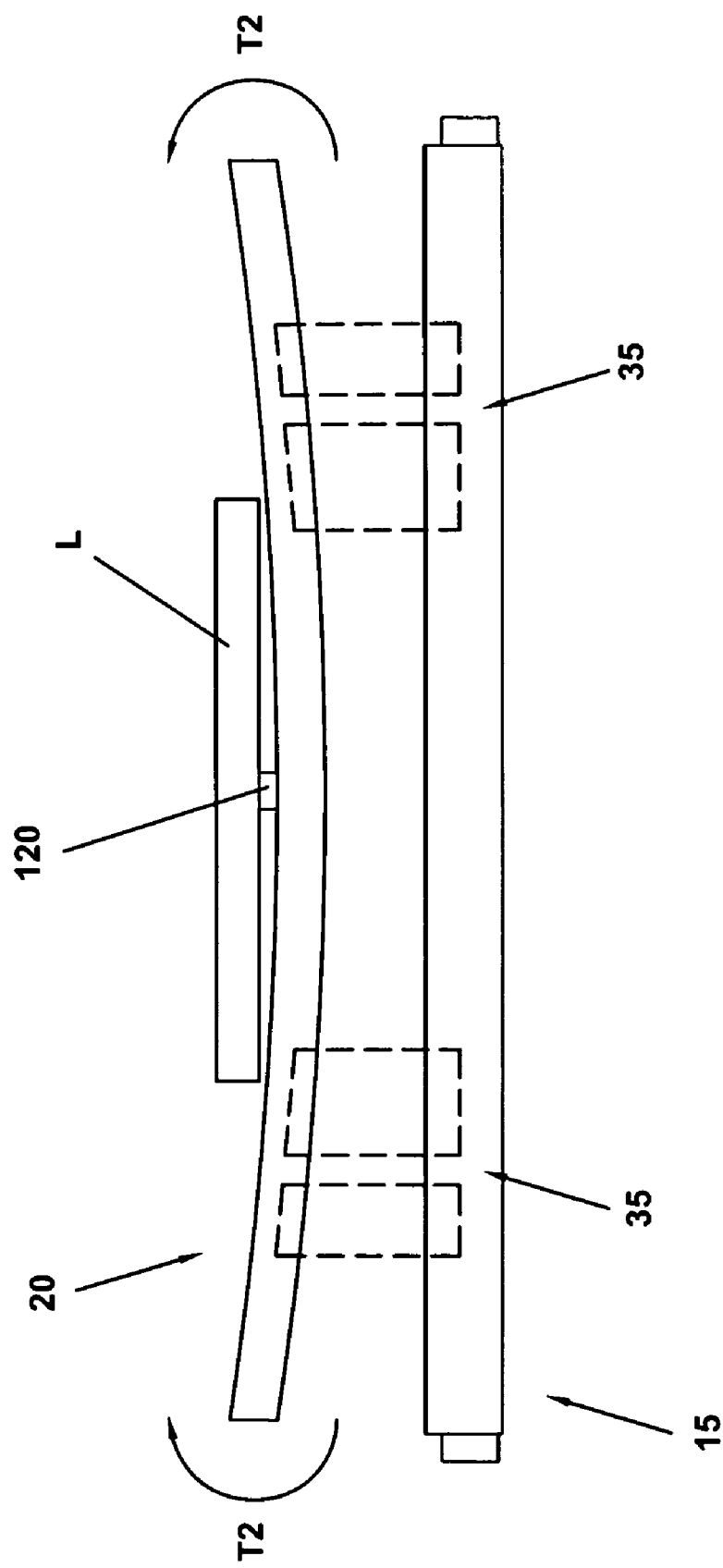
FIG. 12b is a diagrammatic top plan view representing the urged bending of at least a lower portion of a rear frame of a loaded forklift scale of the present invention when provided with a split lower flexure assembly.

Further, and as shown in FIGS. 12a-12b, when a load is present on the lifting forks associated with a mounted forklift scale of the present invention, the resulting forces imparted to the forklift scale generally urge a bending of at least a lower portion of the rear frame 20 thereof around the point of contact between the standoff 120 of the forklift scale and the lifting carriage L of the forklift. Because one or more flexure assemblies 35 are rigidly coupled between the rear frame and the front frame of the forklift scale, this bending force exerted on the rear frame tends to impart a like torque (i.e., in-plane torsional force) to at least each of the lower flexure assemblies.

These in-plane torsional forces are represented in FIGS. 12a-12b as arrows T1 and T2, respectively. FIG. 12a represents a forklift scale of the present invention having solid lower flexure assemblies. FIG. 12b represents a forklift scale of the present invention having split lower flexure assemblies. As would be understood by one skilled in the art, the torsional resistance of the split flexure assembly of FIG. 12b is less than that of the solid flexure assembly of FIG. 12a. As such, the torsional force T1 associated with the forklift scale of FIG. 12a is greater than the torsional force T2 associated with the forklift scale of FIG. 12b (i.e., T1>T2).

Employing a flexure assembly that exhibits low torsional resistance is desirable, as such a flexure assembly permits a vertical displacement of the front frame of the forklift scale that is generally unaffected by the torsional forces experienced by the flexure assemblies. That is, employing (at least lower) flexure assemblies with low torsional resistance substantially prevents any bending moment induced in the rear frame from interfering with the vertical movement of the flexure assemblies. As such, the vertical displacement of the front frame and the readings produced by the load cells are also unaffected.

The tensile strength, and bending, buckling and torsional resistance of the flexure assemblies 30, 35 can preferably be adjusted. The amount of tensile resistance, bending resistance, buckling resistance and/or torsional resistance of a flexure of the present invention, may be calculated and/or experimentally determined, and both techniques would be understood by one skilled in the art.

Figure 13A:
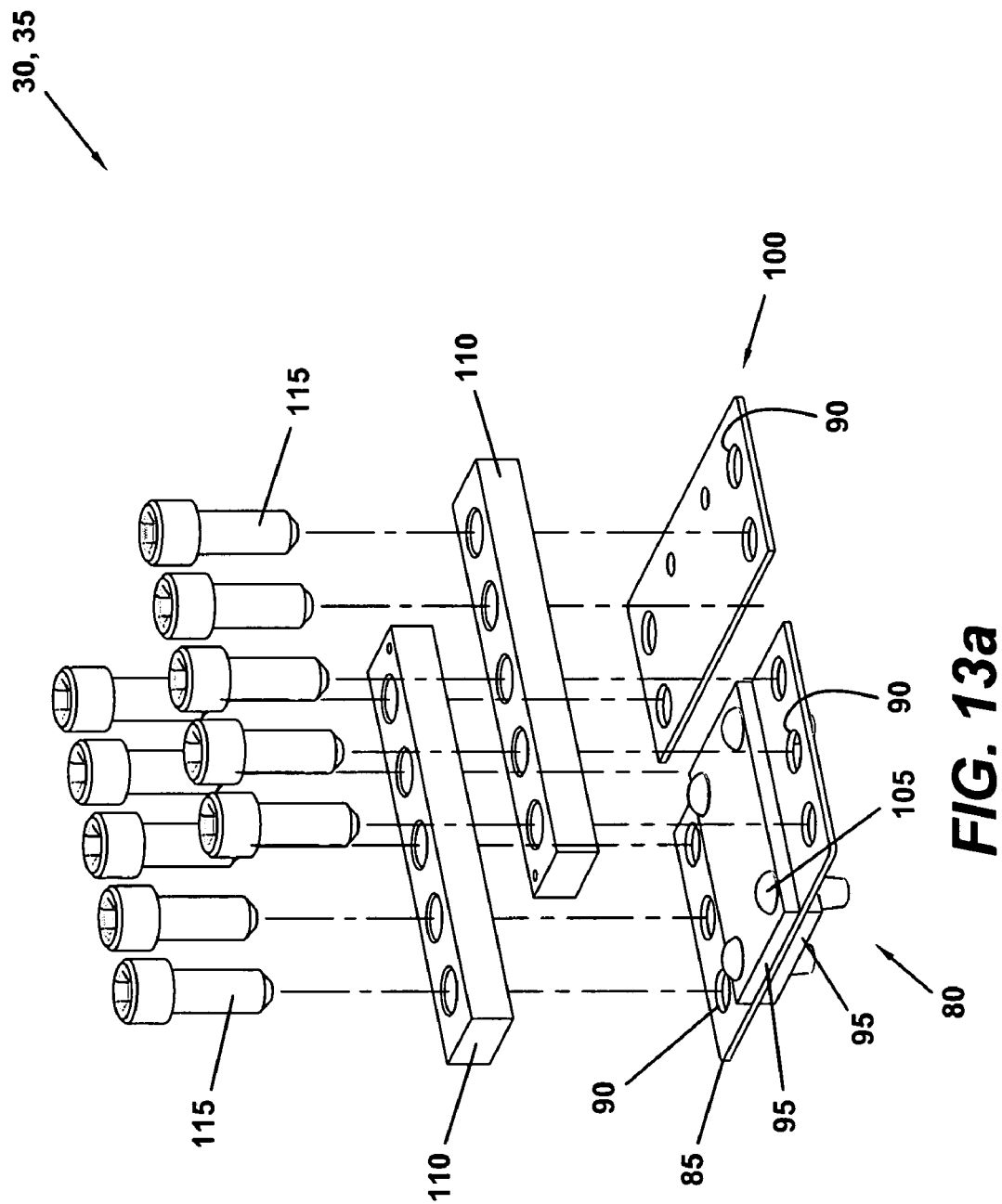
FIG. 13a is an enlarged perspective view of one embodiment of an assembled two-part (split) flexure assembly that can be used on a forklift scale of the present invention.

As can be best observed in FIGS. 13a-13b, this particular embodiment of the flexure assembly 30 is of split design, meaning that the flexure assembly actually includes two individual flexures: a main flexure 80, and a secondary flexure 100. In this embodiment, the main flexure 80 and the secondary flexure 100 are of a different size and strength, although such does not have to be the case.

The main flexure 80 employs a primary flexure plate 85 having three mounting holes 90 for securement thereof to the upper flexure rail 26 of the front frame member 15 and a top surface of the upper horizontal frame member 20a of the rear frame 20 by means of flexure clamp bars 110 and associated threaded fasteners 115. Secondary stiffening plates 95 are affixed to both a top and bottom surface of the primary flexure plate 85, in this case by a number of rivets 105. The secondary stiffening plates 95 act to increase at least the bending and buckling resistance of the main flexure 80. Other main flexure construction techniques could also be employed, such as modifying the thickness of the primary flexure plate 85 and/or secondary stiffening plate(s) 95, employing a different number of secondary stiffening plate(s), using materials of a different modulus, employing primary and/or secondary stiffening plates of different geometries, etc. In this manner, the tensile strength, bending resistance, buckling resistance and/or torsional resistance of the main flexure 85 can be adjusted as needed.

The particular secondary flexure 100 shown is smaller and less rigid than the main flexure 80. In this embodiment, the secondary flexure 100 is constructed by splitting a primary flexure plate 85 as used in the main flexure 80 and eliminating the secondary stiffening plates 95. As with the main flexure, similar alternative secondary flexure construction techniques could also be employed. As with the main flexure 80, such alternative construction techniques allow such mechanical characteristics of the secondary flexure 100 to be adjusted as needed.

While not essential to the present invention, the use of individual flexures of split construction or otherwise dissimilar tensile strength, bending resistance, buckling resistance and/or torsional resistance allows such overall mechanical characteristics of a resulting flexure assembly to be adjusted to a greater degree than would be possible with a single flexure element. More specifically, flexure assemblies can be constructed to provide sufficient resistance to the compression (buckling) or bending forces likely to be encountered during use on a particular forklift scale, while simultaneously exhibiting very low in-plane torsional resistance.

The use of a 3-point suspension design eliminates the complicated and/or time consuming setup procedures that must be performed to balance the reaction loads subsequent to the installation and prior to the use of a forklift scale employing a 4-point suspension design. More specifically, with a dual load cell 4-point scale design, it must be assured that equal loading is applied at each contact point. Equal loading is generally achieved by manipulating an adjuster associated with each contact point and, since manipulation of an adjuster at one contact point can affect loading at another contact point, this can be a time consuming process. Additionally, any deviation from an adjusted arrangement during use of the scale, such as due to a loose adjuster or to repositioning due to impact, etc., can produce inaccurate weight readings. Due to the single lower reaction point of a forklift scale of the present invention, however, there is no need to perform such a setup procedure and therefore, also no concern that the initially installed position of the forklift scale will change during use.

While an exemplary embodiment of a forklift scale has been shown and described herein in an attempt to better illustrate the general concept of the present invention, it is to be realized that derivations of such a forklift scale may be possible without departing from the scope of the present invention. For example, various frame designs may be employed, such that the individual members thereof are dissimilar in size, shape, position, orientation and/or number to those shown and described herein. Interconnection of such frame members may also occur by other means. Mounting of a forklift scale to a forklift, and/or connection of forks to the forklift scale, may also be accomplished in a different manner from that shown herein. Different flexure designs and/or constructions may also be utilized. For example, flexures comprised of different materials and/or flexures of varying thickness may be used in conjunction with or in lieu of the flexures shown. Other changes would be apparent or may become apparent to those skilled in the art. Therefore, while a certain embodiment(s) of the present invention is described in detail above, the scope of the invention is not to be considered limited by such disclosure, and modifications are possible without departing from the spirit of the invention as evidenced by the following claims:

What is claimed is:

1. A forklift scale comprising:
   a rear frame adapted for attachment to a lifting carriage of a forklift;
   a front frame associated with said rear frame, said front frame being vertically displaceable with respect to said rear frame and adapted to receive and retain at least one lifting fork;
   a pair of load cells interposed between said rear frame and said front frame, a first end of each load cell connected to said rear frame, a second end of each load cell connected to said front frame;
   at least one upper flexure assembly connecting a top portion of said front frame to a top portion of said rear frame;
   at least one lower flexure assembly connecting a bottom portion of said front frame to a bottom portion of said rear frame; and
   contact elements associated with said rear frame for contacting said rear frame with said lifting carriage at only three points, a singular lower point of contact occurring substantially at a vertical centerline of said rear frame and two upper points of contact occurring substantially equidistantly from said vertical centerline of said rear frame.

2. The forklift scale of claim 1, wherein said front frame and said rear frame are constructed so as to produce a centrally located viewing window through said scale.

3. The forklift scale of claim 1, wherein said first end of said load cell is an upper end of said load cell, and said second end of said load cell is a lower end of said load cell.

4. The forklift scale of claim 1, wherein said load cells are connected to said front and rear frames by elongate mounting studs.

5. The forklift scale of claim 1, wherein said front frame includes an elongate and substantially horizontally-oriented notched fork carrier for receiving and retaining at least one lifting fork.

6. The forklift scale of claim 1, further comprising a pair of mounting hooks located on a back surface of said rear frame, said mounting hooks for engaging an upper fork carrier on said lifting carriage and suspending said rear frame therefrom, said mounting hooks comprising said two upper points of contact between said rear frame and said lifting carriage.

7. The forklift scale of claim 1, further comprising a standoff extending rearward from a lower portion of said rear frame, said standoff comprising said lower point of contact between said rear frame and said lifting carriage.

8. The forklift scale of claim 1, further comprising at least one hard stop for limiting the vertical displacement of said front frame.

9. The forklift scale of claim 1, further comprising at least one safety restraint for preventing removal of said forklift scale from said forklift carriage and for inhibiting separation of a bottom portion of said rear frame from said lifting carriage.

10. The forklift scale of claim 1, further comprising a telemetry device for wirelessly transmitting digital signals from said load cells to a remote receiver.

11. The forklift scale of claim 1, wherein said at least one lower flexure assembly is of split design.

12. The forklift scale of claim 1, further comprising a restraining element associated with an upper member of said rear frame, said restraining element designed to engage a notch in an upper fork carrier of said lifting carriage and to thereby restrain lateral movement of said forklift scale.

13. The forklift scale of claim 1, further comprising a pair of restraining elements associated with an upper member of said rear frame, said restraining elements each including a latch having a spring-loaded pin designed to engage a notch in an upper fork carrier of said lifting carriage when said latch is actuated and to thereby restrain lateral movement of said forklift scale.

14. A forklift scale comprising:
    a frame assembly, said frame assembly further comprising:
      a rear frame adapted for attachment to a lifting carriage,
      a front frame associated with and substantially parallel to said rear frame, said front frame being vertically displaceable with respect to said rear frame and adapted to receive and retain at least one lifting fork,
      at least one upper flexure assembly connecting a top portion of said front frame to a top portion of said rear frame, and
      at least one lower flexure assembly connecting a bottom portion of said front frame to a bottom portion of said rear frame,
    a pair of load cells interposed between said rear frame and said front frame, a first end of each load cell connected to said rear frame, a second end of each load cell connected to said front frame; and
    three rear frame-to-lifting carriage contact elements extending rearwardly from said rear frame, two of said contact elements located along an upper portion of said rear frame and spaced substantially equidistantly from a vertical centerline thereof, and a third contact element located along a lower portion of said rear frame and substantially at said vertical centerline thereof;
    wherein said rear frame is adapted to contact said lifting carriage only through said three contact elements.

15. The forklift scale of claim 14, wherein said frame assembly is constructed so as to provide a centrally located viewing window through said frame assembly.

16. The forklift scale of claim 14, wherein said first end of said load cell is an upper end of said load cell, and said second end of said load cell is a lower end of said load cell.

17. The forklift scale of claim 14, wherein said front frame includes an elongate and substantially horizontally-oriented notched fork carrier for receiving and retaining at least one lifting fork.

18. The forklift scale of claim 14, further comprising a pair of mounting hooks located on a back surface of said rear frame, said mounting hooks for engaging an upper fork carrier on said lifting carriage and suspending said rear frame therefrom, said mounting hooks further functioning as the two contact elements located along an upper portion of said rear frame.

19. The forklift scale of claim 14, further comprising a standoff extending rearward from a lower portion of said rear frame, said standoff functioning as the third contact element located along a lower portion of said rear frame.

20. The forklift scale of claim 14, further comprising at least one hard stop for limiting the vertical displacement of said front frame.

21. The forklift scale of claim 14, further comprising at least one safety restraint for preventing removal of said forklift scale from said forklift carriage and for inhibiting separation of a bottom portion of said rear frame from said lifting carriage.

22. The forklift scale of claim 14, further comprising a telemetry device for wirelessly transmitting digital signals from said load cells to a remote receiver.

23. The forklift scale of claim 14, wherein said at least one lower flexure assembly is of split design.

24. The forklift scale of claim 14, further comprising a restraining element associated with an upper member of said rear frame, said restraining element designed to engage a notch in an upper fork carrier of said lifting carriage and to thereby restrain lateral movement of said forklift scale.

25. A three-point suspension forklift scale comprising:
   a rear frame;
   a front frame associated with and substantially parallel to said rear frame, said front frame being vertically displaceable with respect to said rear frame and adapted to receive and retain at least one fork;
   a pair of load cells interposed between and connecting said rear frame and said front frame, an upper end of each load cell connected to said rear frame, a lower end of each load cell connected to said front frame;
   at least one upper flexure assembly connecting an upper flexure member of said front frame to a top portion of said rear frame, and at least one lower flexure assembly connecting a lower flexure member of said front frame to a bottom portion of said rear frame, at least said lower flexure assemblies offering greater resistance to tensile and compressive deformation than to torsional deformation;
   at least one hard stop for limiting the vertical displacement of said front frame;
   a pair of mounting hooks located on a back surface of said rear frame and spaced substantially equidistantly from a vertical centerline thereof, said mounting hooks for engaging an upper fork carrier on said lifting carriage and suspending said rear frame therefrom, said mounting hooks further acting as two of three points of contact between said rear frame and said lifting carriage; and
   a standoff extending rearwardly from a lower back portion of said rear frame, said standoff located substantially at said vertical centerline of said rear frame and acting as a third of said three points of contact between said rear frame and said lifting carriage.

26. The forklift scale of claim 25, wherein said front frame and said rear frame are constructed so as to produce a centrally located viewing window therethrough.

27. The forklift scale of claim 25, further comprising at least one lower safety restraint for preventing removal of said forklift scale from said forklift carriage and for inhibiting separation of a bottom portion of said rear frame from said lifting carriage.

28. The forklift scale of claim 25, further comprising a telemetry device for wirelessly transmitting digital signals from said load cells to a remote receiver.

29. A three-point suspension forklift scale comprising:
   a frame assembly, said frame assembly further comprising:
      a rear frame having at least two spaced apart and substantially parallel upper and lower horizontal frame members connected by at least two spaced apart and substantially parallel vertical frame members,
      a front frame having at least two spaced apart and substantially parallel upper and lower horizontal frame members connected by at least two spaced apart and substantially parallel vertical frame members, said front frame substantially parallel to said rear frame and vertically displaceable with respect thereto, said front frame adapted to receive and retain at least one lifting fork,
      at least one hard stop for limiting the vertical displacement of said front frame,
      at least one safety restraint for preventing removal of said forklift scale from said forklift carriage and for inhibiting separation of a bottom portion of said rear frame from said lifting carriage, and
      a centrally-located viewing window passing through said front frame and said rear frame,
   a pair of load cells interposed between and connecting said rear frame and said front frame, an upper end of each load cell connected to said rear frame, a lower end of each load cell connected to said front frame;
   a pair of spaced apart upper flexure assemblies connecting an upper flexure member of said front frame to a top portion of said rear frame, and a pair of spaced apart lower flexure assemblies connecting a lower flexure member of said front frame to a bottom portion of said rear frame, said flexure assemblies offering greater resistance to tensile and compressive deformation than to torsional deformation;
   a pair of mounting hooks located on a back surface of said rear frame and spaced substantially equidistantly from a vertical centerline thereof, said mounting hooks for engaging an upper fork carrier on said lifting carriage and suspending said rear frame therefrom, said mounting hooks further acting as two of three points of contact between said rear frame and said lifting carriage; and
   a standoff extending rearwardly from a lower back portion of said rear frame, said standoff located substantially at said vertical centerline of said rear frame and acting as a third of said three points of contact between said rear frame and said lifting carriage.

30. The forklift scale of claim 29, further comprising a telemetry device for wirelessly transmitting digital signals from said load cells to a remote receiver.

* * * * *